J. M. VAN NEST.
Feed Rack.
No. 47,472.
Patented April 25, 1865.
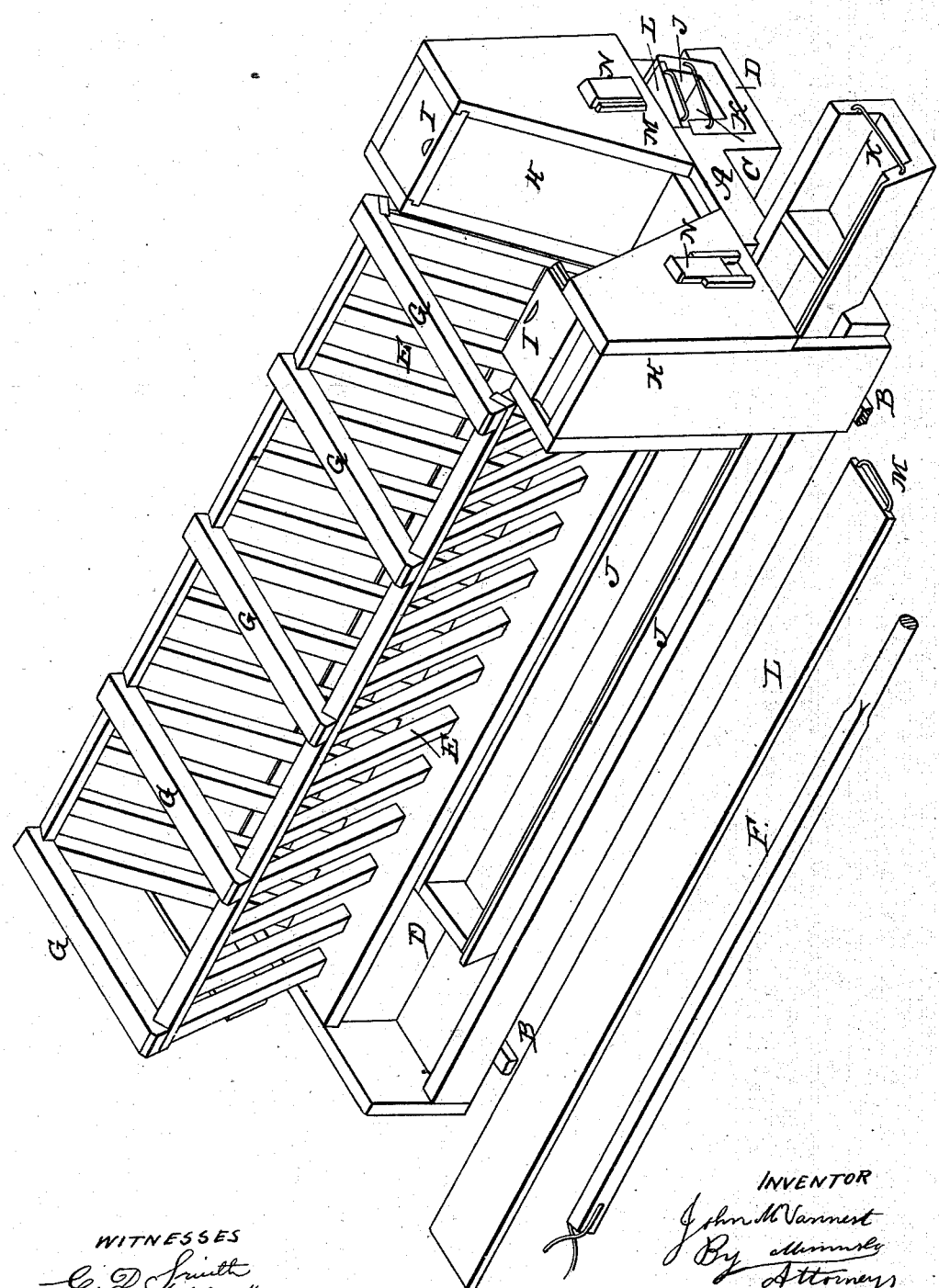

UNITED STATES PATENT OFFICE.

JOHN M. VAN NEST, OF CLAYTON, IOWA.

IMPROVEMENT IN FEED-RACKS.

Specification forming part of Letters Patent No. 47,472, dated April 25, 1865.

*To all whom it may concern:*

Be it known that I, JOHN M. VAN NEST, of Clayton, Grundy county, State of Iowa, have made certain new and useful Improvements in Sheep-Feeders; and I do hereby declare the following to be a full, clear, and exact description of the nature, construction, and operation of the same, reference being had to the annexed drawing, which is made a part of this specification, and which represents my improvements by a perspective view.

The object of my device is to enable a person to feed grain or chop-feed, as well as hay, from a position not exposed to the sheep, to place the grain or chop in the troughs in a convenient manner, and not exposed to the sheep while the troughs are being filled, and not admitting them to the feed until it is uncovered, so as to give them all an equal chance.

To enable a person skilled in manufacturing and using such apparatus is the subject of my application. I will proceed to describe it fully.

The feeding apparatus consists of a frame, A, supported by cross-pieces B B, by which it may be lifted and carried from place to place. The frame incloses a longitudinal opening, C, between the two feed-trough holders D D, and above this opening is a rack, E, for hay or other similar feed, which is suitable for feeding in that manner, such as straw or fodder.

It is proposed to place the end of the feed apparatus against a fence, shed, or outhouse, just as convenience may dictate, after removing a board or two, so as to expose the end of it. Hay is then fed in from the end of the rack, and is pushed in by a fork, F, which is shown lying upon the ground near by. The cleats G are intended to keep the hay from blowing out when exposed in a windy country.

At the end of the apparatus may be seen boxes or granaries H H, which are used to contain grain or chop-feed suitable for sheep. These are filled by opening the doors I, and contain, perhaps, as much as will be required for a week. This is a matter of convenience, and the question of size has nothing to do with the device as respects the feature of novelty.

I have spoken of the trough-holders D on each side, and these are occupied by sliding troughs J J, which have handles K K at their ends, so as to be slipped out beneath the granaries into the shed or lot where the person stands who feeds the sheep. These troughs have lids L, with handles M, which also slip out longitudinally, similarly to the troughs, and with the latter or without them, as required. In the latter case the lids may be conveniently laid away in the space C, under the rack.

N N are gates or doors, which guard the opening by which the feed is run into the troughs as they are moved beneath them.

Some people might not care to use the lids L. Be that as it may, I prefer them, for reasons which I will state. First, when the trough is run back into its position with the feed in, it can be exposed all at once to the sheep, instead of having them poking their noses into it before it is fairly in place; secondly, the feed may be placed in for a considerable time before it is intended for them to eat it, and opened when the proper time arrives; thirdly, it may contain more than a feed, and be closed when they have eaten enough. It or one of them may be used to contain salt, to which the sheep are admitted occasionally. Properly made, the covers will keep out the rain. I will describe the way of using it. The rack being supplied with hay and the granaries with feed, I withdraw the lid of one of the troughs and slip it under the rack. I then pull out the trough a little and lift the gate N, which allows the feed to run out in a little stream. I keep on pulling out the trough, just so fast as to allow the proper quantity of feed to run into the trough, when I close the gate N and replace the lid, slipping the trough back to its place, when I uncover it and allow the sheep to feed, unless I feed at both troughs, when I put the feed in both before uncovering either. After the grain is eaten, the sheep may pick their hay, and the seed and loose hay are caught by the troughs, which prevents waste.

Having thus described my invention, what

I claim as new therein, and desire to secure by Letters Patent, is—

The combination of the sliding trough with the granary, the latter being provided with a spout or opening to discharge the feed into the trough, which moves beneath it, substantially as described.

The above specification of my improved sheep-feeder signed this 25th day of February, 1865.

JOHN M. VAN NEST.

Witnesses:
ALEXR. A. C. KLAUCKE,
EDWARD H. KNIGHT.